(12) United States Patent
Björkengren

(10) Patent No.: US 6,295,441 B1
(45) Date of Patent: Sep. 25, 2001

(54) INPUT DEVICE AND METHOD OF ENTERING DATA INTO AN ELECTRONIC APPARATUS

(75) Inventor: Ulf Björkengren, Bjärred (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/296,008

(22) Filed: Apr. 21, 1999

(30) Foreign Application Priority Data

Apr. 21, 1998 (SE) ................................... 9801379

(51) Int. Cl.$^7$ ...................................... H04Q 7/32
(52) U.S. Cl. ................... 455/90; 455/575; 455/563; 455/566; 455/347; 455/412; 455/348; 455/379; 455/433; 455/428
(58) Field of Search .................. 455/575, 90, 550, 455/563, 566, 424, 403, 347, 348, 351, 412; 379/433, 428

(56) References Cited

U.S. PATENT DOCUMENTS 5,148,471 * 9/1992 Metroka et al. ..................... 455/550

* cited by examiner

Primary Examiner—William Trost
Assistant Examiner—Keith Ferguson
(74) Attorney, Agent, or Firm—Burns, Doane, Swecker & Mathis, L.L.P.

(57) ABSTRACT

An input device for an electronic device such as a mobile phone includes an analog input device for scanning through an input space of records and a digital input device for selecting a current record presented on a display. The analog input device is a flip pivotably arranged by an attachment device on a housing of the electronic device. The attachment device is provided with a rotational sensor device connected to a processing device incorporated in the housing. An angle between the flip and the housing corresponds to a sensor value, translated and interpreted by the processing device, to show a particular record on the display.

7 Claims, 1 Drawing Sheet

INPUT DEVICE AND METHOD OF ENTERING DATA INTO AN ELECTRONIC APPARATUS

The present invention relates to an input device and a method of entering data into an electronic apparatus and more particularly to an input device having analog input means for scanning through an input space of records and digital input means for selecting a current record presented on a display.

BACKGROUND

Electronic apparatuses such as mobile telephones, hand-held or desktop computers or portable digital organizers etc. process and store data created in many places and in many different ways. However, before data can be processed and stored they must be entered and translated into a form interpretable by the particular apparatus. This is performed by or through an input device. After the data have been processed they must be translated back into a form readable by the user, which is performed by an output device.

Electronic apparatuses as mentioned above are in most cases provided with keyboards or keypads for data entry. Hand-held electronic apparatuses such as mobile phones have limited keyboards, wherein each key has several functions and, hence, data entry has been synonymous with keystrokes.

Every operation on a mobile phone requires several keystrokes. In order to make a regular phone call on a prior art mobile phone, as disclosed in a manual describing the mobile phone ERICSSON GF788, © Ericsson Mobile Communications AB, 1996, the area code and phone number are entered on the keypad (keys 0–9) and a YES key is pressed to start the call and the call is ended by pressing a NO key.

The phone is provided with several functions other than making regular phone calls. Most of these functions are controlled through a menu system. In order to move through the menu system and find the different menus, functions or settings arrow keys are used. The arrow keys are pressed until the desired menu, function or setting is reached and it is selected by pressing the YES key. The operation of moving through the menu system is often called scrolling.

Phone numbers and subscriber names can be stored and recalled from an electronic phone book. A phone number is stored by entering the phone number on the keypad. Then the arrow key(s) is pressed until the Store menu is shown and to confirm the storing the YES key is pressed.

As mentioned above each key has several functions and represents different symbols and letters. For example key 1 corresponds to one space, -, ?, !, „ ., :, ", ', (, ), 1, and key 2 corresponds to A, B, C, Å, Ä, Aͱ, à, çA, 2 and so on for the remaining keys. Further, * is pressed to get lower-case letters, a key is pressed and held to get the number directly, and a volume key is pressed together with a numeric key to get the second or third position in the list of letters and symbols of each key.

To store a name of a subscriber of the already entered phone number the first letter of the name is entered by pressing the appropriate numeric key as many times as required to obtain the desired letter or symbol, for example three times on key 2 to get a letter C. The next letter of the name is entered when the cursor has moved to the next position and so on until the name is done. The name is confirmed and stored in a selected memory position by pressing the YES key.

Phone numbers can be recalled in many ways. First a phone number can be recalled by name, wherein a RecallName menu is selected and either the full name or the first letter is entered and confirmed by the YES key. The first name that matches the letter string is displayed. A second way to recall a number is to scroll through the phone book to the desired name. In both cases the selected name and number will blink on the display until the YES key is pressed to call the number.

Further, the phone numbers and names in the phone book can be changed through an EditPhBook menu. The EditPhBook menu is selected, whereupon either the full name or the first letter of the desired name is entered and is confirmed by pressing the YES key. The first name that matches the letter string is displayed. Another way to find the name is to scroll to the wanted name. The name is scrolled to change it letter by letter and the changed name is confirmed and stored by pressing the YES key. Then the phone number is changed in a similar way.

A problem with the above mentioned prior art mobile phone ERICSSON GF788 and several other mobile phones having the same or similar functions and menu system is the above described way of moving through the menu system and finding the different menus, functions or settings by using arrow keys or the like and the way of operating the phone and its functions by using many difficult, akward and time-consuming keystrokes. In order to activate and use some of the functions such as find different symbols, wherein each key has several functions, the user must probably read the manual.

SUMMARY

It is therefore an object invention to provide an improved input device for an electronic apparatus and more particularly an input device having analog input means for scanning or scrolling through an input space of records and digital input means for selecting a current record presented on a display.

This is accomplished by the input device according to claim 1, wherein said analog input means is a flip, pivotably arranged by means of attachment means provided with rotational sensor means on a housing of said electronic apparatus, where an angle between said flip and said housing denotes the current record of said input space.

Another object of the invention is to provide an input device which is easy to operate even on a small electronic apparatus such as a mobile telephone. This is obtained by the input device according to the invention having the flip which is relatively large and hence easy to grip and operate.

An advantage of the input device according to the invention is that the scanning or scrolling through the input space and the selecting of records, such as alpha numeric characters and menu options presented on a display are performed in an easy none time-consuming way requiring a small number of keystrokes.

BRIEF DESCRIPTION OF THE DRAWINGS

In order to explain the invention in more detail and the advantages and features of the invention a preferred embodiment will be described in detail below, reference being made to the accompanying drawing, in which.

DETAILED DESCRIPTION

Figure 1:
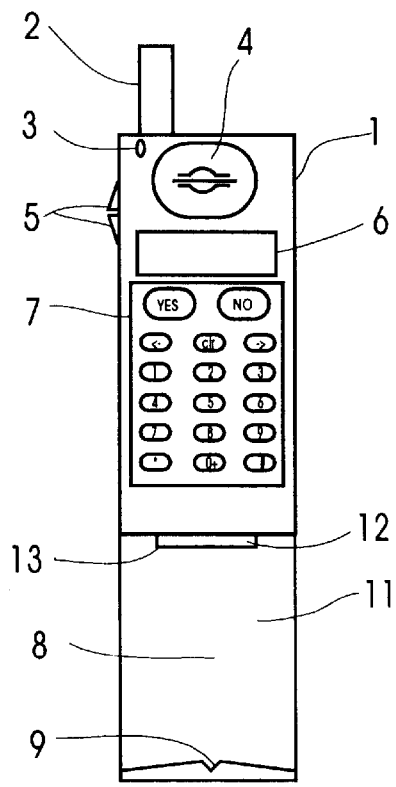
FIG. 1 is a schematical front view of a mobile phone provided with an input device according to the invention.
Figure 2:
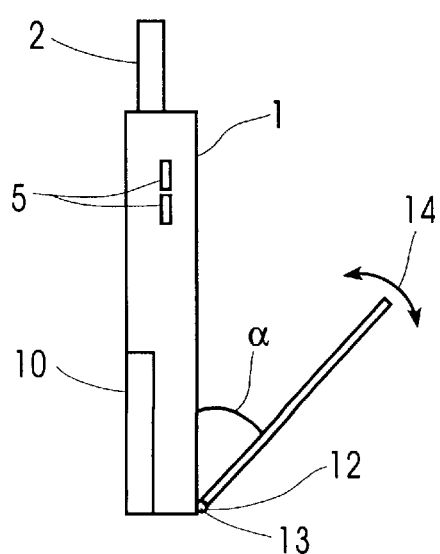
FIG. 2 is a side view of the mobile phone in FIG. 1.

With reference to FIGS. 1 and 2, a mobile phone is shown, having a housing 1, an antenna 2, a status light 3, an earpiece 4, volume keys 5, a display 6, a keypad 7, an inside microphone 8 and microphone channel 9, a battery 10, a flip 11, pivotably arranged on sad housing 1 by means of attachment means 12. Further, processing means such as a CPU, control circuits and memory means are provided inside the housing 1 and connected to the different components and means discribed above.

According to the invention, the mobile phone is provided with an input device comprising analog input means for scanning through an input space of records and digital input means for selecting a current record presented on a display except the conventional keypad input means. The analog input means is in form of the flip 11, pivotably arranged by means of the attachment means 12, such as a hinge, provided with rotational sensor means 13, integrated in the attachment means 12, on the housing 1 of the phone. An angle α between the flip and the housing denotes the current record of said input space.

In the following description, numerous specific details, such as key names, function names etc. are provided in detail in order to give a more thorough description of the present invention. It will be obvious for those skilled in the art that the present invention may be practiced without these specific details. Some well-known features are not described in detail so as not to make the present invention unclear.

In order to make a regular phone call on the mobile phone in the drawings the area code and phone number are entered on the 0–9 keys on the keypad 7 and a YES key or another action key is pressed to start the call and the call is ended by pressing a NO key in a similar way as on a conventional mobile phone.

The mobile phone having an input device according to the invention is provided with several functions other than making regular phone calls. Most of these functions are controlled through a menu system. In order to move through the menu system and find the different menus, functions or settings the input device according to the invention is used. The input device is activated and deactivated by pressing an action key such as one of the volume keys 5 or by selecting a particular menu in the menu system.

If the flip 11 is moved, i.e. opened or closed, illustrated by a double directed arrow 14 in FIG. 2, the rotational sensor means 13 detects the position or angle α is translated and interpreted by the processing means and a particular record, i.e. a menu, function or setting, is shown on the display 6. The flip 11 is moved until the desired menu, function or setting is reached and it is selected by pressing the digital input means or an action key, preferrably a side mounted key such as one of the volume keys 5. The operation of moving through the menu system is often called scrolling.

Phone numbers and subscriber names can be stored and recalled from an electronic phone book. A phone number is stored by entering the phone number on the keypad. Then the flip 11 is opened or closed until the Store menu is shown, and to confirm the storing the YES key is pressed. However, it is also possible to scroll through an input space including all necessary alpha numeric characters such as digits, alphabet letters and punctuation marks by moving the flip and selecting each digit by pressing the action key.

In order to store a name of a subscriber of the already entered phone number the first letter of the name is entered by scrolling the input space and then the desired character is selected by pressing the action key. The next letter of the name is entered when the cursor has moved to the next position and so on until the complete name is entered. The name is confirmed and stored in a selected memory position by pressing the YES key. Of course the memory position can be selected by moving the flip 11 as described.

Phone numbers can be recalled in many ways. First a phone number can be recalled by scrolling the menu system and selecting a RecallName menu and then either the full name or the first letter is entered as described above an confirmed by the YES key. The first name that matches the letter string is displayed. A second way to recall a number is to scroll through the phone book, by moving the flip, to the desired name. In both cases the selected name and number will blink on the display until the YES key is pressed to call the number.

Further, the phone numbers and names in the phone book can be changed through an EditPhBook menu. The EditPhBook menu is selected, whereupon either the full name or the first letter of the desired name is entered by means of flip motion and is confirmed by pressing the action key. The first name that matches the letter string is displayed. Another way to find the name is to scroll to the wanted name. The name is scrolled to change it letter by letter and the changed name is confirmed and stored by pressing the YES key. Then the phone number is changed in a similar way. All the scrolling and letter finding is performed by moving the flip to a position, in which the flip has an appropriate angle corresponding to a desired letter position or letter in the alphabet.

Although the invention has been described by way of a specific embodiment thereof it should be apparent that the present invention provides a mobile telephone that fully satisfies the aims and advantages set forth above, and alternatives, modifications and variations are apparent to those skilled in the art.

It is also possible to combine the flip scrolling function with a keystroke. For example, if an action key, such as #, is pressed the different menus in the menu system are shown in another language.

Other electronic apparatuses such as hand-held computers or portable digital organizers etc. can be provided with an input device according to the invention, not necessarily a flip but similar means.

What is claimed is:

1. An input device for an electronic apparatus, comprising analog input means for scanning through an input space of records, and digital input means for selecting a current record presented on a display, wherein said analog input means is a flip pivotably arranged by attachment means on a housing of said electronic apparatus, and said attachment means is provided with a rotational sensor means connected to processing means incorporated in the housing, and an angle between said flip and said housing corresponds to a sensor value, translated and interpreted by the processing means, to show a particular record on the display.

2. An input device according to claim 1, wherein said input space is a set of menus, functions or settings.

3. An input device according to claim 1, wherein said input space is a set of alpha numeric characters.

4. A method of entering data into an electronic apparatus by an input device for an electronic apparatus, comprising analog input means for scanning through an input space of records, and digital input means for selecting a current record presented on a display, wherein said analog input means is a flip pivotably arranged by attachment means on a housing of said electronic apparatus, said attachment means is provided with a rotational sensor means connected to processing means incorporated in the housing, and an angle between said flip and said housing corresponds to a sensor value, translated and interpreted by the processing means, to show a particular record on the display, the method comprising the steps of moving said flip to a position forming an angle between said flip and said housing, detecting said angle, generating a sensor signal corresponding to said angle, translating and interpreting the sensor signal in said processing means in to a processed signal, and showing a record corresponding to said signal on the display.

5. A method according to claim 4, further comprising the step of selecting said record by pressing an action key.

6. A method according to claim 4, further comprising the steps of activating and deactivating said input device by pressing another action key.

7. A method according to claim 4, further comparing the steps of activating and deactivating said input device by selecting a particular menu.

\* \* \* \* \*